Feb. 4, 1964 C. VAN DER LELY ETAL 3,120,379
DEVICE FOR SPREADING GRANULAR OR POWDERY MATERIAL
Filed Feb. 25, 1960 4 Sheets-Sheet 4
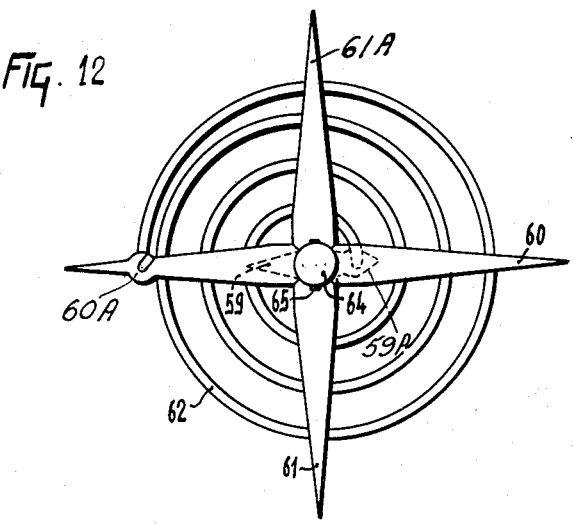
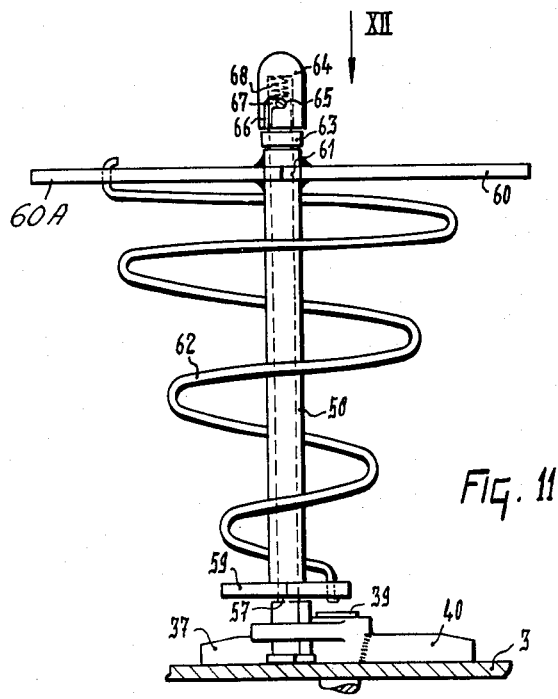

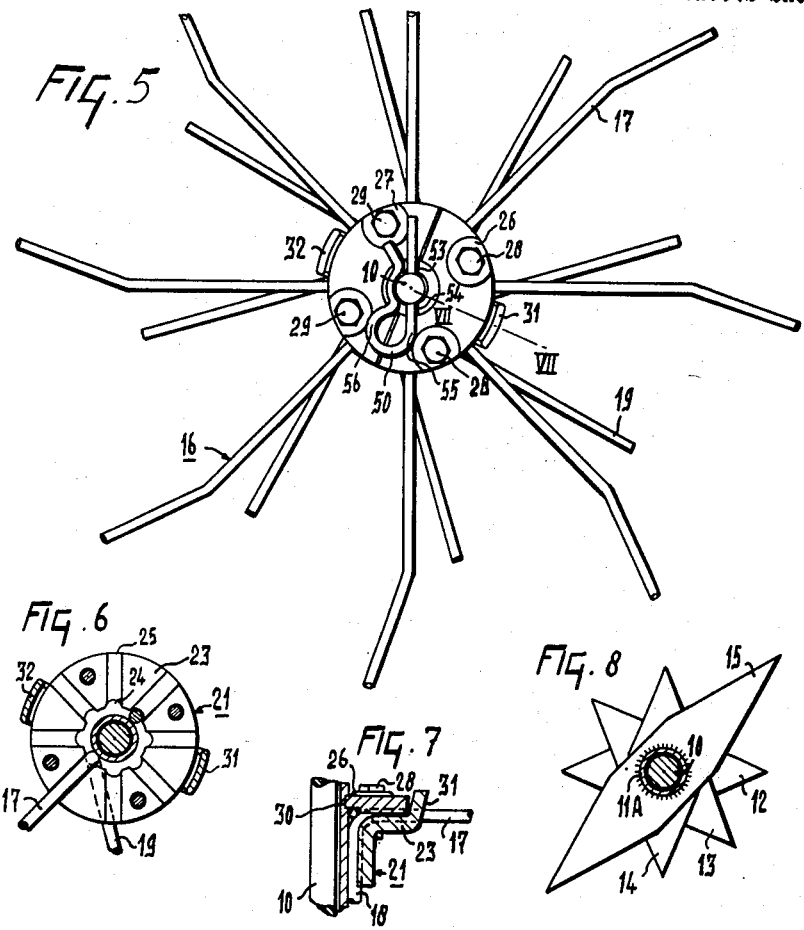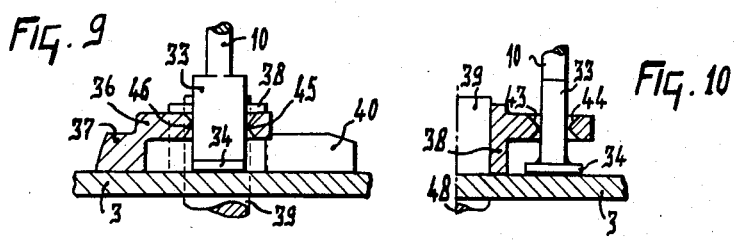

United States Patent Office 3,120,379
Patented Feb. 4, 1964

1

3,120,379
DEVICE FOR SPREADING GRANULAR OR
POWDERY MATERIAL
Cornelis van der Lely, Zug, Switzerland, and Ary van der Lely, Maasland, Netherlands, assignors to C. van der Lely N.V., Maasland, Netherlands, a limited-liability company of the Netherlands
Filed Feb. 25, 1960, Ser. No. 11,084
Claims priority, application Netherlands Mar. 13, 1959
30 Claims. (Cl. 259—134)

The invention relates to devices for spreading granular or powdery material and more particular to an agitator which is movable within a container and which prevents the material from caking in the container and which comprises a rod standing upright in the container.

The invention has for its object to provide a device of the kind set forth, in which the agitator ensures a satisfactory supply of material from the container to the spreading member. In accordance with the invention this may be achieved by providing a rod with at least one element provided with extensions, which is movable relative to the rod. The element is ensured against detachment from the rod by means of such a fastening member that the element can be readily removed from the rod, whilst the fastening member is arranged near the top end of the rod. This construction permits moreover easy cleaning of the agitator, since the element can be removed from the rod by decoupling the fastening member. Since the fastening member is provided at the top end of the rod, the release of the element can be readily carried out on the open top side of the container.

An advantageous embodiment of the device according to the invention is obtained when the element is adapted to turn about the rod.

According to a further aspect of the invention the element is provided with detachable, elongated extensions, having two ends which extend from the element. By arranging the extensions so as to be detachable, cleaning thereof is readily performed and replacement, if desired, can be easily carried out.

In a further embodiment of the agitator, which may be very successfully used in certain cases, the element comprises a helical extension in upright position.

The invention furthermore relates to a device for distributing granular or powdery material, comprising a container and a spreading member rotating about an axis of rotation, with which is connected an agitator standing upright in the container. The agitator is linked to the spreading member at a distance from the axis of the latter, whilst at least part of the agitator is freely rotatable about the longitudinal axis thereof. The agitator is adapted to pivot about only one hinge axis, which is located at least approximately in a plane at right angles to the axis of rotation of the spreading member and crosses this axis of rotation. By arranging the agitator with the spreading member in this manner, the agitator is capable of moving efficiently in the container.

The invention relates, moreover, to a device for spreading granular or powdery material, comprising a container and a spreading member arranged underneath the container and forming at least part of the bottom of the container, whilst, in accordance with the invention, the lower portion of the container consists of an annulus which bears on the spreading member and which is movable with respect to the further part of the container and in which provision is made of at least one outlet port for the material, the annulus being provided furthermore with an adjusting arm, to which is rigidly secured a pin, which can be inserted into a hole provided in a beam or the like of the frame, so that the annulus can be secured against rotation with respect to the further part of the container. Thus a simple construction is obtained, in which the place of the outlet port relative to the frame can be readily changed in a simple manner.

For a better understanding of the invention and to show how the same may be carried into effect, reference will now be made, by way of example, to the accompanying drawings, in which:

FIGURE 5 is a plan view corresponding to FIGURE 3 as seen in the direction of the arrow V;

FIGURE 6 is a sectional plan view taken on the line VI—VI of FIGURE 3;

FIGURE 7 is a sectional detail taken on the line VII—VII of FIGURE 5;

FIGURE 8 is a sectional plan view taken on the line VIII—VIII of FIGURE 3;

FIGURES 9 and 10 are both sectional views of a detail of FIGURE 4, taken respectively upon the lines XI—XI and X—X;

FIGURE 11 is a side elevation of a modified form of the mechanism shown in FIGURE 3; and FIGURE 12 is a plan view corresponding to FIGURE 11 taken in the direction of the arrow XII.

Figures 1, 2:
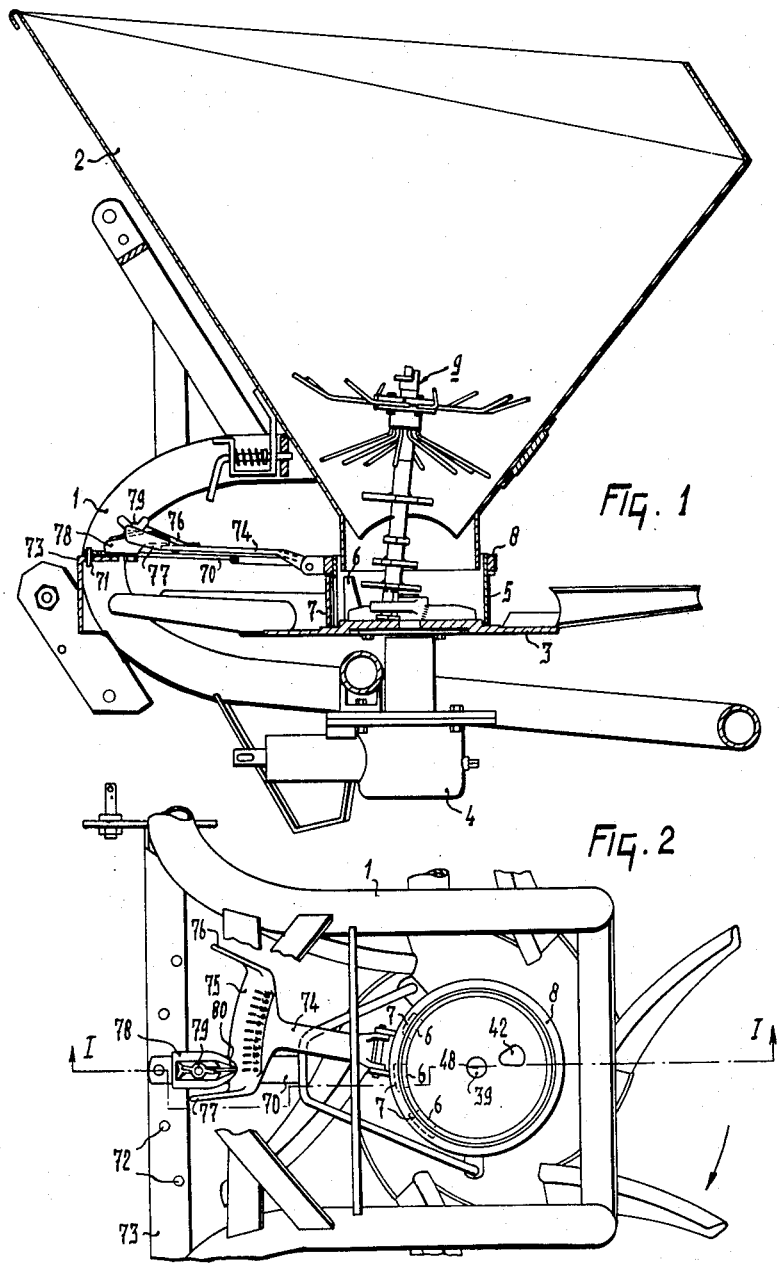
FIGURE 1 is a sectional side elevation of a device for spreading granular or powdery material, the section being taken along the line I—I of FIGURE 2.
FIGURE 2 is a plan view corresponding to FIGURE 1, but with certain parts removed in order to show the construction therebeneath.

Referring first to FIGURES 1 and 2, the spreading device there shown has a frame 1 supporting a container 2 for the material to be spread.

Below the container 2 is arranged a disc-shaped spreading member 3, which is adapted to be rotated in the direction shown by the arrow in FIGURE 2.

The drive to the spreading member 3 is obtained with the aid of a mechanical transmission contained in a casing 4. The lower part of the container 2 has a cylindrical outlet which is entered in an annulus 5. The latter bears upon the spreading member 3 and is formed with three outlet openings 6 through which material stored in the container 2 can be supplied to the spreading member 3. Shutters 7 are disposed in front of the outlet opening 6, the shutters being mounted upon a ring 8. By turning the ring 8 bearing the shutters 7, the openings 6 can be masked to a greater or lesser extent in order to control the quantity of material sent therethrough to the spreading member 3.

An agitator 9 is mounted within the container 2, for the purpose of ensuring that the material stored in the container can flow freely and continuously from the container 2 onto the spreading member 3. The agitator 9 is shown in detail in FIGURES 3 to 10 to which attention is now directed.

The agitator 9 consists of a rod 10 which is mounted in the container so as to stand substantially upright therein. Oblong elements in the form of sleeves 11A and 11B are mounted upon the rod 10 so as to be each freely turnable thereon. The lower sleeve 11A has four stirrers 12, 13, 14 and 15 fixed thereto. Each one of these stirrers consists of a piece of strip material which is pointed at each end and which is centrally secured around the sleeve 11A. In FIGURE 8 the shape and relative arrangement of the stirrers can be seen. The stirrers 12, 13 and 14 are of the same shape, and they have different angular settings with respect to the axis of the sleeve 11A. The stirrer 15 is similar to the other stirrers but has a greater overall length. It will be noticed from FIGURE 8 that the stirrer 15 has an angular setting in regard to the axis of the sleeve 11A such that the stirrer 15 does not completely overlie any of the other stirrers 12 to 14 when the assembly is viewed from above.

The upper sleeve 11B carries eight detachable stirrers 16 made from spring steel wire. Each stirrer 16 has an upper portion 17 which extends substantially radially outwardly from the sleeve 11B. The radially outer end of the portion 17 is bent upwardly through an acute angle as appears from FIGURE 3. As can be seen from FIGURE 5, the outwardly bent end of the portion 17 is also laterally bent. At its radially inner end, each portion 17 of the stirrer 16 joins with a portion 18 which extends downwardly along a line which is substantially parallel to the axis 20 of the rod 10 and the sleeve 11B. The lower end of each portion 18 is continued into a portion 19. As appears from FIGURE 3, the portion 19 is bent radially outwardly through an acute angle with reference to the axis 20. The portion 16 is moreover twisted so that when the stirrer is viewed in plan the portions 17 and 19 are contained in vertical planes which are inclined to one another as can be seen from the sectional plan of FIGURE 6.

The stirrers 16 are secured to the sleeve 11B with the aid of a fastening device 21. The latter has a collar-like portion 22 and an annular flange-like portion 23. The collar 22 has a series of axially extending grooves 24 formed in its inner curved surface, as seen best in FIGURE 6. Each of these grooves 24 opens into a radially extending groove 25 upon the upper face of the flange 23. Each of the grooves 24 receives the portion 18 of a stirrer 16.

In FIGURE 6, to simplify the illustration, six of the stirrers have been omitted. Of the two stirrers shown, one appears in section and the other is shown unsectioned. The portion 17 of each stirrer 16 lies in a groove 25. The dimensions of the collar 22 are such that when all the portions 18 of the stirrers 16 are accommodated in the grooves 24, the portions 18 just fit around the exterior of the sleeve 11B in the way shown in FIGURES 3 and 6. The assembly of the stirrers 16 is held in position axially of the sleeve 11A with the aid of a pair of retaining plates 26 and 27. These plates may be seen in FIGURES 3, 5 and 7. The retaining plates constitute a flat split ring, the plate 26 being held in position upon the flange 23 with the aid of two bolts 28, whilst the plate 27 is held in position with the aid of two bolts 29. Both plates are formed with radially extending grooves in which are accommodated the portions 17 of the stirrers as appears from FIGURE 7. By tightening the bolts 28 and 29, the portions 17 of the stirrers are gripped between the retaining plates and the flange 23. A groove 30 is formed in the sleeve 11B, and the inner circularly extending edges of the plates 26 and 27 are entered in this groove so as to prevent axial displacement of the stirrer assembly. At diametrically opposite locations, the flange 23 is formed with a pair of upwardly extending lugs 31 and 32. As can be seen from FIGURE 7, the lugs diverge upwardly from the axis of the rod 10 so that when the plates 26 and 27 are placed in position and are tightened with the aid of the bolts 28 and 29, the lugs 31 and 32 tend to force the retaining plates into the groove 30.

The lower end of the rod 10 is formed as a rectangular block 33. As appears best from FIGURE 4, the width of the block is equal to the diameter of the rod 10. The length of the block is considerably greater than its width, as also is the depth of the block, as can be seen from FIGURE 3. The lower end of the block is formed with a foot 34 which is square in shape. The side of the square is equal to the length of the block 33 so that such side is greater than the width of the block 33. The shape of the block and its foot can be seen from FIGURES 9 and 10.

The spreading member 3 is secured upon a shaft 39 arranged to be driven from the transmission contained in the housing 4. As appears best from FIGURES 3 and 4, the shaft 39 extends through the spreading member 3 and has freely mounted thereon a boss 38 carrying blades 37 and 40. A web 36 extends laterally from the boss near the upper end thereof. Another web 41 is attached to the boss near the lower end thereof, such web engaging under a tongue 42 rooted upon the surface of the spreading member 3. The web 41 and the tongue 42 by virtue of their engagement ensure that the boss is driven with the spreading member 3 and that the boss is held in position upon the shaft 39. As can be seen from FIGURE 4, the web 36 is formed with a rectangular hole 35. The long opposing sides 43 and 44 of the hole and the short opposing sides 45 and 46 are chamfered at top and bottom as can be seen from the sections of FIGURES 9 and 10. The block 33 is entered in the hole 35 and it will be understood that the block will behave as though it is loosely pivotally mounted about two axes at right angles to one another. These two axes are conveniently identified by the section lines XI—XI and X—X in FIGURE 4. It will be noted that these two horizontal pivotal axes are respectively parallel to opposite side edges of the hole and that one of them passes through the axis of rotation 48 of the shaft 39, whilst the other is perpendicular to said one axis. By virtue of these two pivotal axes, it will be understood that the agitator carried upon the rod 10 will be capable of tilting when the agitator is whirled about the axis 48. Thus the stirrers can perform a compound movement which includes a component directed vertically.

Figure 3:
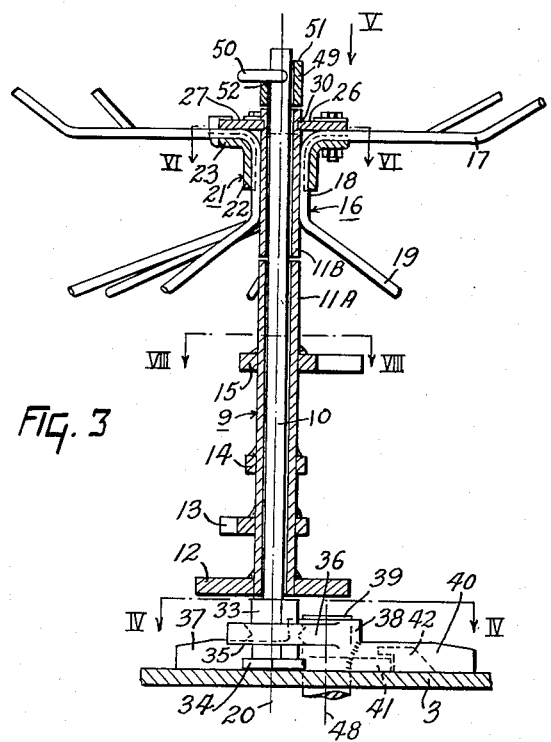
FIGURE 3 is a side elevation to an enlarged scale of part of the mechanism shown in FIGURE 1, taken on the line III—III of FIGURE 4, but with a sectional side elevation of a part of the agitator.
Figure 4:
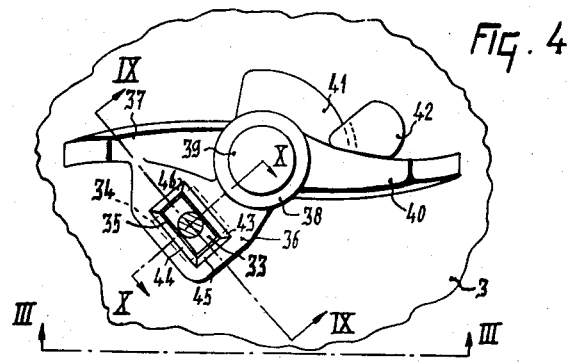
FIGURE 4 is a sectional plan view taken on the line IV—IV of FIGURE 3.

Above the sleeve 11B there is a retaining ring 49 secured to the rod 10 with the aid of quick-release means. The upper part of the ring 49 is gapped so as to form two aligned shoulders 53 and 54 (see FIGURE 5). A pin 50 is entered in a hole formed in the rod 10, the pin 50, as seen in FIGURE 3, lying above the upper surface 52 of the gapped side of the ring and below the upper surface 51 of the ungapped side of the ring. The pin 50 has a straight shank portion 55 which passes through the hole in the rod 10 and which engages the shoulders 53 and 54. The head portion 56 of the pin is turned back towards the shank portion and is shaped so as to engage over the rod 10, as may be seen from FIGURE 5. It will be understood that the pin 50 can be removed by pulling upon the head 56 which must then bend outwardly so as to disengage from the rod 10. Once the pin has been removed the ring 49 may be slipped from the end of the rod 10. When the ring 49 is in position, the sleeves 11A and 11B are held between this ring and the block 33 so that any substantial axial movement of these sleeves is prevented. Quick-release of the retaining ring 49 facilitates removal of the sleeves 11A and 11B which can be simply withdrawn upwardly from the rod 10 after the ring 49 has been removed. When the sleeves 11A and 11B have been removed from the rod they can be withdrawn from the container in which the agitator is mounted, and cleaned ready for replacement. If it is desired to remove also the rod 10, it will be necessary to remove the bladed boss 38 carrying the web 36 since the foot 34 on the block cannot be drawn upwardly through the hole 35 in the web. The bladed boss can however be easily removed since it has only to be rotated with respect to the spreading member 3 in order to withdraw the web 41 from beneath the tongue 42. Once the bladed boss has been removed, the rod can be withdrawn downwardly through the hole 35. The easy removability of the agitator is not only advantageous for the cleaning of the same, but is also a useful feature where the spreader is employed for distributing material which will not cake in the container. The agitator can then be completely removed.

If so desired, the sleeve 11B with the stirrer assembly thereon may be removed from the rod 10 and replaced in an inverted position where the portions 17 of the stirrers lie below the portions 19. It will be appreciated that the extremities of the portions 17 will then be inclined downwardly instead of upwardly. From consideration of FIGURE 1 it will be apparent that the downwardly inclined extremities of the portions 17 will be more nearly at right angles to the adjacent oblique walls of the container 2. This alternative position for the sleeve 11B may produce more effective agitation of certain kinds of material within the container 2 so as to prevent caking of the material in the container.

Another constructional embodiment of the agitator is shown in FIGURES 11 and 12 to which reference will now be made. There is a rod 57 which is similar to the rod 10 of the previous construction. The lower end of the rod 57 is the same as that of the rod 10 and is supported in like manner. A sleeve 58 encloses rod 57, and at its lower end has fixed thereto radially extending stirrer arms 59 and 59A. At its upper end the sleeve 58 has four equiangularly spaced stirrer arms 60, 61, 60A and 61A. The stirrer arms 59 and 59A as also 60, 61, 60A and 61A, are all formed from strip material and are pointed towards their radially outer ends. Further stirring means are provided in the form of a spirally extending wire 62, the spiral converging downwardly and the lower end of the wire being entered in a hole formed in the stirrer arm 59A. The upper end of the wire is entered in a hole formed in the stirrer arm 60A.

The rod 57 protrudes at its upper end through the sleeve 58 and has a washer 63 mounted upon it. A domed cap 64 is located over the upper end of the rod 57. The cap is held in place by a pin 65 which is fixed in the rod and which is engaged in a bayonet slot 66 in the cap. When the cap is in position, the pin 65 is located at the blind end of the horizontal portion 67 of the bayonet slot. A spring 68 within the cap 64 serves to press the cap upwardly thus ensuring that the lower edge of the slot portion 67 is forced into engagement with the pin 65, thereby preventing unintentional removal of the cap. It will be understood tha the cap can be rapidly removed by simply turning it relative to the rod 57 so that the pin 67 can ride into the open end of the bayonet slot 66. Once the cap has been removed, the stirrer assembly can be easily removed for the purpose of cleaning.

In order to act upon the direction in which the material is supplied from the container through the outlet ports 6 to the spreading member 3 and distributed by the latter, the outlet ports 6 can be changed with respect to the axis of rotation 48 of the spreading member. See FIGURES 1 and 2. To this end the annulus 5 is provided with an adjusting arm 70, to which is rigidly secured a pin 71. This pin 71 can be inserted into one of the holes 72 in a beam 73, secured to the frame, in order to lock the annulus 5 with the outlet ports 6 against rotation with respect to the axis of rotation 48. If the outlet ports 6 are to be displaced relatively to the axis of rotation 48, the adjusting arm 70 with the pin 71 can be slightly lifted to withdraw the pin 71 out of one of the holes 72 and to insert it into a further hole of the beam 73. For a displacement of the shutters 7, which are adapted to shut the outlet ports 6 to a greater or smaller extent, with respect to the said ports, the ring 8 is connected with an arm 74, which is provided at one end with a plate-shaped dial 75, at the ends of which handles 76 and 77 are provided. The shutters 7 can be locked in various positions relative to the outlet ports 6 by fixing in position the arm 74 with the plate-shaped dial 75 with respect to the adjusting arm 70. To this end the adjusting arm 70 is provided with a clamp 78, which is secured to the adjusting arm 70 by means of a bolt 79. The clamp 78 has a pointer 80, which is located above the dial 75. By tightening the bolt 79 the clamp 78 is urged against the adjusting arm 70, so that the plate-shaped dial 75 is clamped tight between the clamp 78 and the adjusting arm 70.

What we claim is:

1. An agitator adapted for being supported in a container of a device for spreading granular or powdery material said agitator being further adapted for movement with respect to the container for preventing the material from caking in the container, the agitator comprising: a rod supported in a substantially upright position within the container and adapted for revolving movement within the container, at least one oblong element slidably supported on said rod for movement axially thereof, an extension, means supporting said extension on the oblong element such that the extension extends at least in part laterally from the rod, and fastening means for securing the oblong element against detachment from said rod, said fastening means including quick release means which enables ready removal of said oblong element from said rod, said fastening means being positioned uppermost on the rod.

2. An agitator as claimed in claim 1, wherein the fastening means includes a ring surrounding the rod and a pin, said ring being secured against release from the rod by means of said pin.

3. An agitator as claimed in claim 2, wherein the rod projects beyond the ring, the top side of which has a higher and a lower portion, the pin being located above the lower portion on the side lying between the higher and the lower portions.

4. An agitator as claimed in claim 1 comprising at least one further extension, each extension consisting of a piece of strip-shaped material, which tapers sharply at at least one end thereof.

5. An agitator as claimed in claim 4, wherein the strip-shaped extensions are provided one above the other, the extensions being located in relatively shifted positions, an extension of a higher position projecting further beyond the rod than an extension of a lower position.

6. An agitator as claimed in claim 4 wherein each extension projects beyond the element on two opposite sides thereof.

7. An agitator as claimed in claim 1, said means supporting said extension permits detachment of the latter from the oblong element, the end of the detachable extension being substantially at right angles to the longitudinal axis of the element and including two portions which are at an angle to each other.

8. An agitator as claimed in claim 7, wherein one of the two portions of the end of a detachable extension being at an angle to each other is at an angle to a plane at right angles to the axis of the element, the said portion extending so that it is at an acute angle to the container wall, when the element is slipped onto the rod in a first position, and is at least approximately at right angles to an oblique container wall, when the element is slipped onto the rod in the inverse position.

9. An agitator as claimed in claim 1, wherein the element is provided with a helical extension which extends in upright position.

10. An agitator as claimed in claim 9, wherein the helical extension is narrower near the lower end of the element than near the top end of the element.

11. An agitator as claimed in claim 10, wherein the helical extension has the shape of a wire and is resilient, the ends of the said extension being secured to strips connected with the element.

12. An agitator adapted for being supported in a container of a device for spreading granular or powdery material, said agitator being further adapted for moving with respect to the container and for preventing the material from caking in the container, the agitator comprising: a rod supported in a substantially upright position within the container, at least one oblong element on said rod, extensions on said oblong element extending at least partly sidewardly from said rod, said element being movably supported relative to said rod and extending in a direction parallel to said rod, and fastening means for securing said element against detachment from said rod, said fastening means including quick-release means, which enables ready removal of said element from said rod, said fastening means being positioned uppermost on the rod.

13. An agitator as claimed in claim 12, comprising means swingably connecting the rod to a shaft adapted for moving the agitator in said container, said element being turnable about the rod.

14. An agitator adapted for being supported in a container of a device for spreading granular or powdery material, said agitator being further adapted for moving with respect to the container and for preventing the material from caking in the container, the agitator comprising: a rod supported in a substantially upright position within the container, said rod having a lower end which is adapted for being coupled to a movable shaft such that said lower end of the rod is eccentric with respect to the shaft, at least one oblong element movably mounted on said rod, said element having a longitudinal axis which coincides with the center line of said rod, extensions mounted on said element and extending at least partly sidewardly from said element and fastening means supported uppermost on said rod for securing said element against detachment from said rod while permitting ready removal of said element from said rod.

15. An agitator adapted for being supported in a container of a device for spreading granular or powdery material, said agitator being further adapted for moving with respect to the container for preventing the material from caking in the container, said agitator comprising: at least one member detachably arranged on a movable rod, extensions on said member and extending at least partly sidewardly from said member, said extensions being removable from said member, a flange mounted to said element and a plate detachably coupled to said flange, a portion of each of said extensions being arranged between the said flange and said plate.

16. An agitator adapted for being supported in a container of a device for spreading granular or powdery material, said agitator being further adapted for moving with respect to the container for preventing the material from caking in the container, said agitator comprising: at least one element with a longitudinal axis centrally situated, elongated extensions detachably mounted on said element, said extensions each having two ends extending sidewardly relative to the said longitudinal axis and a portion between the said two ends extending parallel to the longitudinal axis; and a collar-like portion situated around said element, said portion between the ends being mounted between the element and said collar-like portion, the collar-like portion including a flange, at least one plate detachably mounted on said flange and on said element, one end of said two ends being partly mounted between the flange and the plate.

17. An agitator as claimed in claim 16, wherein the first extremity of a detachable extension occupies a higher position than the second extremity of an extension.

18. An agitator as claimed in claim 17, wherein the first extremity of an extension projects further from the element than the second extremity.

19. An agitator as claimed in claim 18 wherein the detachable extensions are arranged at least substantially near the top end of the element.

20. An agitator as claimed in claim 19, wherein an extension extends over a distance from the oblong element which is at least approximately equal to one third of the distance between two opposite points of the side walls of the container at the level of the extension.

21. An agitator as claimed in claim 20, wherein two elements are provided on a rod, one element being provided with strip-shaped extensions and the other with detachable, elongated, resilient extensions.

22. An agitator as claimed in claim 16, wherein the said element extends upwardly in the container, a first end of said two ends of each extension being at right angles to the longitudinal axis and the second end being at an acute angle to the said axis, said second end being orientated downwardly from said element.

23. An agitator as claimed in claim 16 comprising a rod movable in said container, said element being detachably mounted on said rod, and fastening means mounted on said rod for securing said element against detachment from said rod.

24. An agitator as claimed in claim 16, comprising a rod coupled eccentrically to a movable shaft, said element being rotatably mounted on said rod.

25. An agitator as claimed in claim 16, wherein the said collar-like portion is provided with a groove for each extension, the said portion of each extension extending parallel to the said longitudinal axis being situated in a corresponding groove, said flange being provided with grooves corresponding to the grooves in said collar-like portion, the end of each extension arranged between the flange and the plate being mounted in a groove in the said flange.

26. An agitator as claimed in claim 16, wherein the plate comprises two flat half rings, each ring having an inner rim located in a groove of the said element.

27. An agitator as claimed in claim 26, wherein the flange has an upright rim for each ring, each of said rims having a slanting side extending along the outer edge of a ring, the slanting side being situated such that the upper end of the rim is farther from the said longitudinal axis than the lower end.

28. An agitator adapted for being supported in a container of a device for spreading granular or powdery material, said agitator being further adapted for moving with respect to the container and for preventing the material from caking in the container, the agitator comprising: a helical extension positioned upright in the container, said extension being an upper and lower end, said lower end being narrower than said upper end.

29. An agitator adapted for being supported in a container of a device for spreading granular or powdery material, said agitator being further adapted for moving with respect to the container and for preventing the material from caking in the container, the agitator comprising: a helical extension position upright in the container and having an upper and lower end, a rod coupled eccentrically to a movable shaft, said helical extension being rotatably mounted on said rod, said helical extension being narrower near the lower end than near the upper end.

30. An agitator adapted for being supported in a container of a device for spreading granular or powdery material, said agitator being further adapted for moving with respect to the container and for preventing the material from caking in the container, the agitator comprising: an element having a longitudinal axis and being positioned upright in the container, a rod in said container, said element being mounted removably on said rod, fastening means on the upper end of said rod for detachably securing said element on said rod, extensions on said element, said extensions each having at least one end extending sidewardly from the element, said end being at least partly at an angle to a plane at right angles to the axis of the element, the said end extending so that it is at an acute angle to the container wall, when the element is slipped onto the rod in a first position, and is at least approximately at right angles to an oblique container wall, when the element is slipped onto the rod in the inverse position.

References Cited in the file of this patent

UNITED STATES PATENTS

| | | |
|---|---|---|
| 280,437 | Armstrong | July 3, 1883 |
| 891,534 | Gibson | June 23, 1908 |
| 1,166,476 | Parrish | Jan. 4, 1916 |
| 1,733,562 | Shireman | Oct. 29, 1929 |
| 2,120,543 | Broussard | June 14, 1938 |
| 2,535,414 | Heidger | Dec. 26, 1950 |
| 2,660,210 | Berglind | Nov. 24, 1953 |
| 2,750,162 | Kircher | June 12, 1956 |
| 2,820,619 | Dache | Jan. 21, 1958 |
| 2,896,925 | Place | July 28, 1959 |
| 2,964,301 | Bosse | Dec. 13, 1960 |
| 3,024,010 | Sperling | Mar. 6, 1962 |